R. M. MERRIMAN.
VEHICLE TIRE.
APPLICATION FILED MAR. 13, 1907.
899,061.
Patented Sept. 22, 1908.
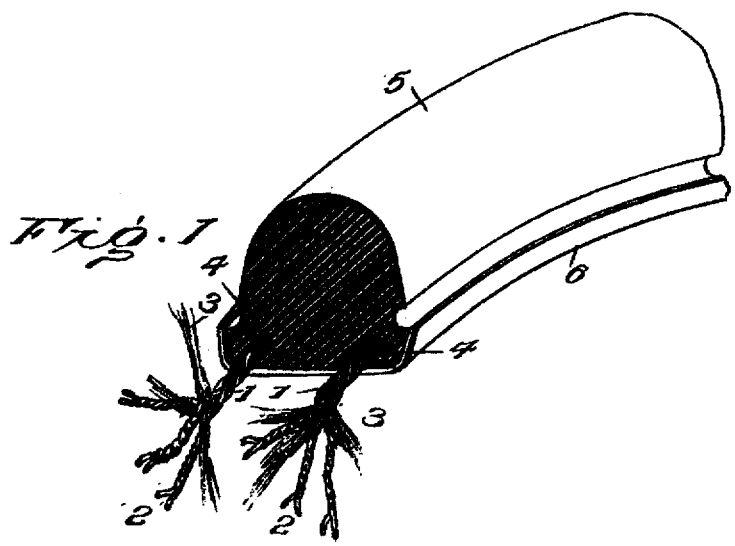
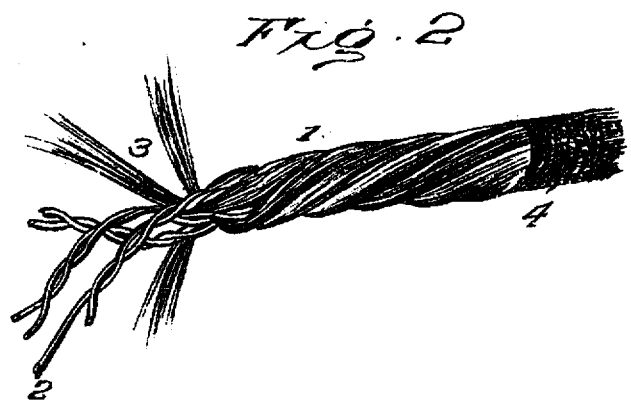

UNITED STATES PATENT OFFICE.

ROBERT M. MERRIMAN, OF YOUNGSTOWN, OHIO.

VEHICLE-TIRE.

No. 899,061.

Specification of Letters Patent.

Patented Sept. 22, 1908.

Application filed March 13, 1907. Serial No. 362,167.

*To all whom it may concern:*

Be it known that I, ROBERT M. MERRIMAN, citizen of the United States, residing at Youngstown, in the county of Mahoning and State of Ohio, have invented certain new and useful Improvements in Vehicle-Tires, of which the following is a specification.

This invention is designed to reinforce tires of the yielding or soft tread type in a manner to prevent creeping or separation of the material forming the tire from the reinforcement. It is common to embed a wire, metal strip or cable in the rubber or like material of a tire, but in practice such wire strip, cable or like reinforcement separates from the material and permits the latter to creep or the reinforcement cuts through the material.

The present invention aims to obviate the objections herein noted and to combine with a tire a reinforcement which will maintain a fixed relation to the material of the tire under all conditions.

This invention contemplates a reinforcement embodying metal and textile strands woven together in a way to completely inclose the metal strands, and subsequently coating the reinforcement with a rubber cement and then vulcanizing said reinforcement after it has been embodied or molded into the tire so as to become in effect a part thereof, thereby effectually preventing creeping of the material of the tire or the cutting of the reinforcement through the tire when the latter is subjected to stress such as resulting from usage. Inasmuch as the tire in its finished state is the result of a definite process, the two are apparently inseparable; hence the invention may be said to consist of the tire and the process of constructing the same.

In the accompanying drawings forming a part of the specifications: Figure 1 is a perspective view of a portion of a tire embodying the invention. Fig. 2 is a detail view of the reinforcement.

The invention is adaptable to any form of tire, solid, cushion or pneumatic, and to tires for heavy or light loads. The reinforcement may be continuous or in straight lengths according as the tire is of annular formation or provided in lengths. The tire 5 may embody any number of reinforcements and the latter may be disposed or arranged within the tire to obtain the best results according to the special purpose for which the tire is designed and the nature of the rim structure 6 of the wheel for which the tire is adapted.

The reinforcement 1 in general construction appears similar to a rope or cable and comprises metal strands 2 and textile strands 3. The metal strands are intended to sustain linear tension whereas the textile strands being interwoven with the metal strands, give the necessary bulk, and moreover absorb the rubber cement, whereby the vulcanizing causes the material of the tire to cling to the textile portion of the reinforcement in a manner to prevent creeping of the material or the cutting of the reinforcement through the material. The metal strands 2 and the textile strands 3 are interwoven and twisted together to provide a cord or rope of ordinary form, the metal strands being completely enveloped by the textile strands and the latter being so interwoven with the metal strands as to prevent possible separation of the two sets of strands. As shown on the drawings the metal strands are arranged in pairs, the strands of each individual pair being twisted together and the various pairs being also twisted together and interwoven with the textile strands to provide the reinforcing cable. The reinforcement is dipped into, or otherwise coated with rubber cement 4 which penetrating the textile portion of the reinforcement, becomes practically inseparable therefrom. In forming the tire, the reinforcement is embedded therein and is vulcanized, thereby causing the rubber of the tire to become practically inseparable from the reinforcement; hence precluding creeping of the material or the cutting of the reinforcement through the material of the tire.

Having thus described the invention, what is claimed as new is:

The herein described reinforcing cable for rubber tires, the said cable consisting of a plurality of metal and textile strands, the metal strands being twisted together and the textile strands being twisted and interwoven so as to completely cover the metal strands, the cable being saturated with a rubber cement which penetrates the textile strands so that when the cable is embedded and vulcanized in the tire the reinforcement and tire are practically inseparable from each other.

In testimony whereof I affix my signature in presence of two witnesses.

ROBERT M. MERRIMAN. [L. S.]

Witnesses:
　JOHN SCHLARB,
　W. C. McKAIN.